(12) United States Patent
Abele et al.

(10) Patent No.: US 8,770,617 B2
(45) Date of Patent: Jul. 8, 2014

(54) AIRBAG AND METHOD OF MANUFACTURING AN AIRBAG

(75) Inventors: Timo Abele, Abtsgmuend (DE); Werner Freisler, Schwaebisch Gmuend (DE)

(73) Assignee: TRW Automotive GmbH, Alfdorf (DE)

( * ) Notice: Subject to any disclaimer, the term of this patent is extended or adjusted under 35 U.S.C. 154(b) by 0 days.

(21) Appl. No.: 13/351,264

(22) Filed: Jan. 17, 2012

(65) Prior Publication Data

US 2013/0020787 A1 Jan. 24, 2013

(30) Foreign Application Priority Data

Mar. 15, 2011 (DE) .......................... 10 2011 014 135

(51) Int. Cl.
*B60R 21/206* (2011.01)
*B60R 21/2338* (2011.01)
*B60R 21/231* (2011.01)

(52) U.S. Cl.
CPC ........... *B60R 21/206* (2013.01); *B60R 21/2338* (2013.01); *B60R 2021/23169* (2013.01); *B60R 2021/23382* (2013.01)
USPC ..................................... 280/730.1; 280/743.2

(58) Field of Classification Search
CPC B60R 21/206; B60R 21/2338; B60R 21/233; B60R 21/2334; B60R 2021/23169; B60R 2021/23382; B60R 2021/23571; B60R 2021/23324; B60R 2021/0051
USPC ............. 280/730.1, 729, 743.2, 743.1, 730.2, 280/728.1
See application file for complete search history.

(56) References Cited

U.S. PATENT DOCUMENTS

| | | | | |
|---|---|---|---|---|
| 7,604,250 B2 * | 10/2009 | Hotta et al. | ................. | 280/728.2 |
| 7,766,374 B2 * | 8/2010 | Abele et al. | ................. | 280/730.1 |
| 7,891,700 B2 * | 2/2011 | Ishida | ......................... | 280/730.1 |
| 8,272,667 B2 * | 9/2012 | Schneider et al. | ......... | 280/730.1 |
| 2007/0200320 A1 * | 8/2007 | Keshavaraj | ................. | 280/730.1 |
| 2009/0085333 A1 * | 4/2009 | Imaeda et al. | ............. | 280/730.1 |
| 2010/0164212 A1 * | 7/2010 | Nakayama | ................. | 280/743.2 |
| 2012/0007345 A1 * | 1/2012 | Lee | ........................... | 280/728.2 |

FOREIGN PATENT DOCUMENTS

WO   WO 2010/066323 A1 *   6/2010   ............ B60R 21/231

* cited by examiner

Primary Examiner — Keith Frisby
(74) Attorney, Agent, or Firm — Tarolli, Sundheim, Covell & Tummino LLP

(57) ABSTRACT

The invention relates to an airbag (12) of a vehicle occupant restraint system (10) comprising plural juxtaposed compartments (16) delimited outwardly by opposing external walls (18) and against each other by partitions (20), wherein the airbag (12), in the inflated condition, has a form overall bent and elongate in cross-section. In the bending area the external wall (18) includes a cut-out (22) that is closed by an inserted insert (24) tensioned in the deployed condition which in the longitudinal direction has a length ($L_E$) different in the bending area from the opposing external wall portion (28) of the chamber (16) so as to produce the bending.

The invention furthermore relates to a method of manufacturing an airbag of this type.

15 Claims, 2 Drawing Sheets

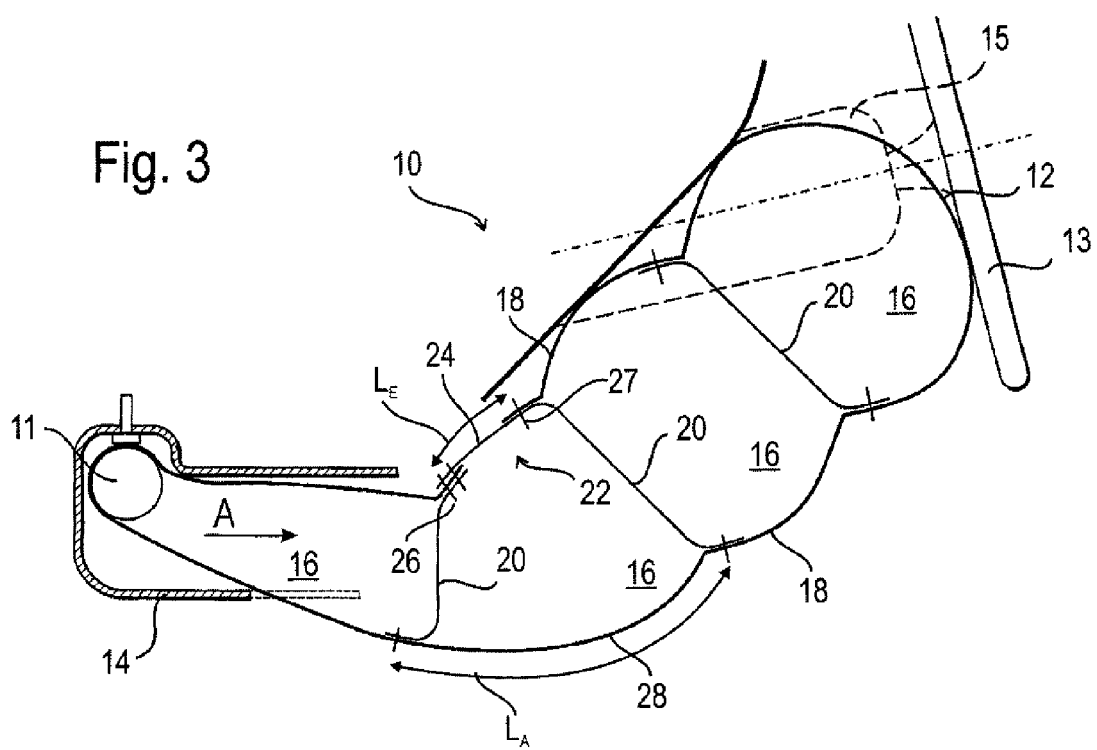

AIRBAG AND METHOD OF MANUFACTURING AN AIRBAG

FIELD OF THE INVENTION

The invention relates to an airbag of a vehicle occupant restraint system comprising plural juxtaposed compartments that are delimited outwardly by opposed external walls and against each other by partitions, wherein the airbag, when in the inflated condition, in cross-section has an elongate overall bent shape, as well as to a method of manufacturing an airbag for a vehicle occupant restraint system.

BACKGROUND OF THE INVENTION

Airbags of this type are known from the state of the art, the bent elongate shape of the inflated airbag extending, for example, around a component of the vehicle.

It is the object of the invention to provide an airbag and a manufacturing method for an airbag permitting a bent shape in a simple and advantageous manner.

SUMMARY OF THE INVENTION

In accordance with the invention, the object is achieved by a generic airbag, the external wall having in the bent portion a cut-out which is closed by an inserted insert tensioned in the deployed condition having in the longitudinal direction a length that is different from the opposite external wall portion of the compartment in the bent area so as to provide the bending. In this way, the bending of the airbag can be achieved without additional elements, for instance in the form of additional rebound straps, or purse-string seams being required. This permits in particular proper and rapid deployment of the airbag. In the inflated condition of the airbag the insert is free of purse-string seams.

The insert can be provided at the inside or the outside of the bending.

Preferably, the insert is also fastened to the external wall by the seams by which a partition is fixed to the external wall. In this manner providing additional seams at the airbag can be avoided.

The external wall opposing the insert can be formed in one piece.

In order to obtain a most uniform curvature of the airbag, the insert preferably extends over substantially the entire width of the airbag.

The insert may extend from one partition to the neighboring partition. The external wall of a compartment can thus be completely replaced on one side of the airbag with the insert.

In order to reduce the number of separate airbag elements during manufacture of the airbag the insert can be an integral extension of a partition.

The insert is a woven fabric, for instance.

It is possible that the airbag extends in a curved shape from one mounting end, preferably opposite to the direction of gravitation.

The airbag may be in the form of a mattress. In this manner the airbag covers a large area in the vehicle, while the volume of the airbag is relatively small.

Preferably the airbag is a knee airbag exiting from or below the instrument panel and being positioned in front of the same.

The airbag can be configured to be completely free of purse-string seams so as to permit rapid and advantageous deployment of the airbag.

The object of the invention is furthermore achieved by a method of manufacturing an airbag for a vehicle occupant restraint system according to the invention, comprising the steps of providing an airbag elongate in cross-section having a plurality of compartments arranged successively in longitudinal direction, each compartment having a predetermined length in a spreading direction in the inflated condition, of providing a cut-out in an external wall and of inserting an insert having an insert length in the spreading direction which is shorter or longer than the length of the external wall portion of the chamber opposing the cut-out.

BRIEF DESCRIPTION OF THE DRAWINGS

FIG. 3 shows an airbag according to a third embodiment of the invention.

DESCRIPTION OF THE EXAMPLE EMBODIMENT

Figure 1:
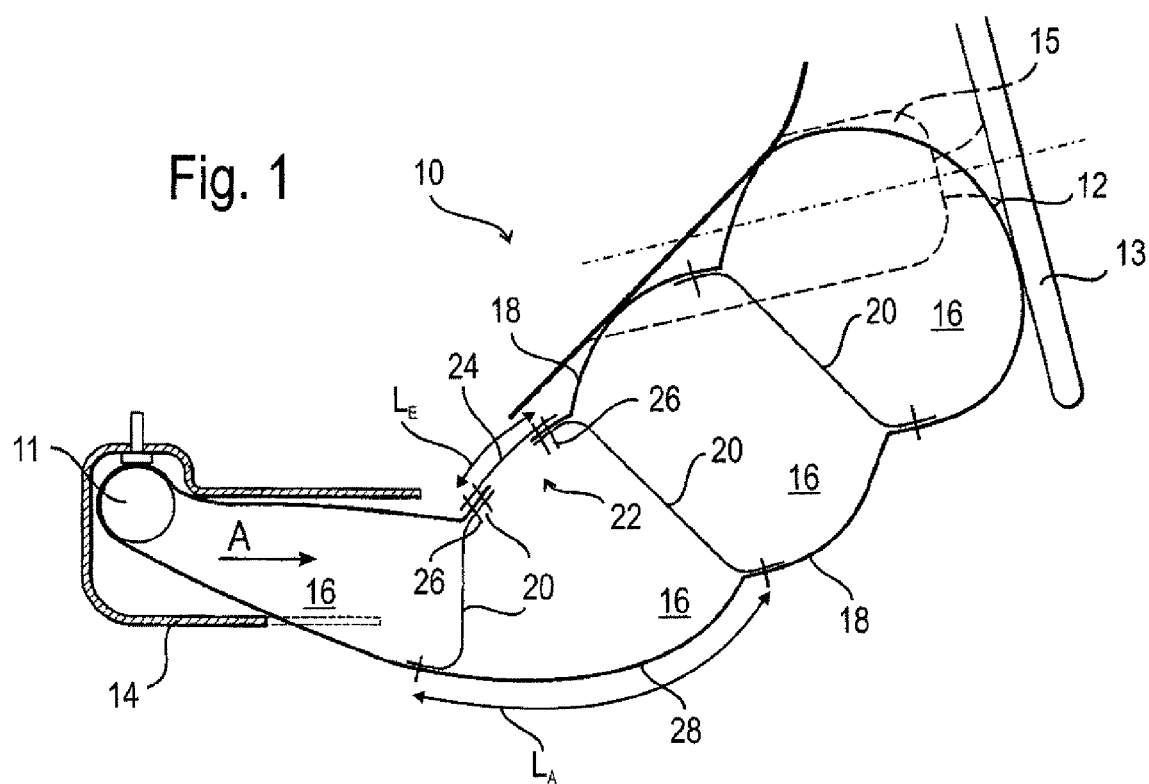
FIG. 1 shows an airbag according to the invention in accordance with a first embodiment.

FIG. 1 illustrates a vehicle occupant restraint system 10 comprising an inflator 11 and an airbag 12 in the deployed and inflated condition. The airbag 12 is mounted to a housing 14 of the vehicle occupant restraint system and extends in curved shape upwards from its mounting end at the housing 14 against the direction of gravitation.

The airbag 12 is in the form of a mattress and approximately has the shape of a bent block and exhibits an approximately rectangular cross-section vertically to the spreading direction.

The airbag 12 is divided into plural juxtaposed compartments 16 that are outwardly delimited by opposing external walls 18 and against each other by partitions 20. The airbag 12 has, when in the inflated condition, an elongate form viewed from the side, the airbag 12 having in the area of the second compartment 16 starting from the mounting at the housing 14 a bending which permits the curved shape of the airbag 12.

In the illustrated embodiment, the airbag 12 is a knee airbag and extends below a steering wheel 13 and a steering column 15 from the instrument panel or it extends below the latter toward the occupant.

In the bending area the external wall 18 includes a cut-out 22 which is closed by an inserted insert 24 tensioned in the deployed condition. The insert 24 is provided inwardly of the bending. The insert 24 extends along the entire width of the airbag 12 and is fastened at the external wall 18 by seams 26. The seams 26 are in the form of joint seams which at the same time attach a partition 20 to the external wall 18.

The airbag 12 is free of purse-string seams. In the deployed and inflated condition of the airbag 12 the insert 24 is tensioned. The insert 24 is especially not gathered in the area of the cut-out 22. This permits proper and rapid deployment of the airbag 12.

The insert 24 has in the longitudinal direction a length $L_E$ that is shorter than the length $L_A$ of the opposite external wall portion 28 of the compartment 16 in the bending area, wherein mainly the distance of the fastening seams is crucial to the length.

The external wall 18 opposing the insert 24 is formed in one piece.

It is also possible that an insert does not extend over the entire width of the airbag 12. For example, also two inserts each having the width of the airbag can be provided at the edges. The shape of the inflated airbag is thus more strongly curved at the edges so that a "three-dimensional" bending is produced. Thereby the airbag is adapted to envelope the steering column 15, for instance, more properly.

Figure 2:
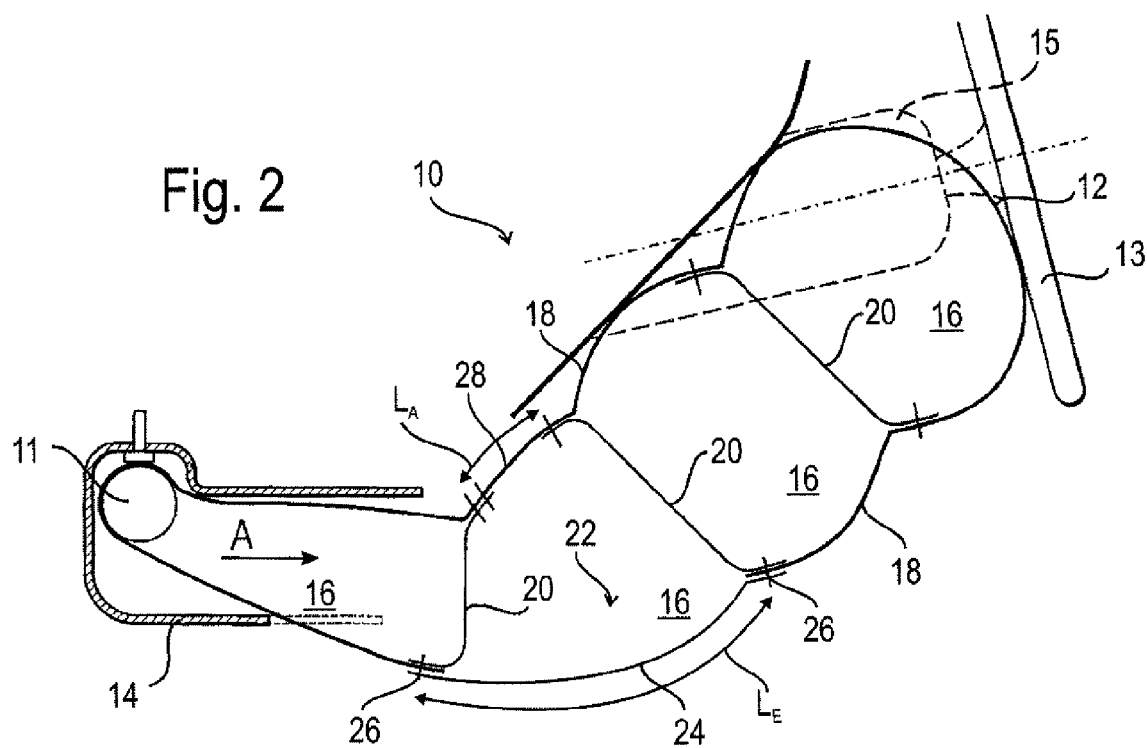
FIG. 2 shows an airbag according to a second embodiment of the invention.

FIG. 2 shows a second embodiment of the airbag, the insert 24 being provided at the outside of the bending and the length $L_E$ in the longitudinal direction of the insert 24 being longer than the length $L_A$ of the opposite external wall portion 28 of the corresponding compartment 16 in the bending area. Analogously to the first embodiment, the insert 24 is connected to the external wall 18 and the partitions 20 of the airbag 12 by joint seams 26.

In each of the first two embodiments the insert is in the form of a separate piece of fabric.

FIG. 3 illustrates another embodiment in which the insert 24 is an integral extension of a partition 20. The insert 24 is provided, analogously to the first embodiment, at a cut-out 22 inwardly of the bending of the airbag 12.

A seam 27 separates the extension constituting the insert 24 and the partition 20 and connects the partition 20 and the insert 24 to the external wall 18 of the airbag 12.

As a matter of course, it is also possible that the extension of the partition 20 forming the insert 24 is provided outwardly of the bending and closes a cut-out 22 provided outwardly of the bending analogously to FIG. 2.

In each of the shown embodiments only one compartment 16 with one insert 24 is configured, for the sake of clarity. However, it is also possible, as a matter of course, that plural compartments 16 including a respective insert 24 are configured and thus cause plural bendings in the shape of the inflated airbag 12.

Hereinafter a manufacturing method of the airbag 12 is illustrated by way of the example of the first embodiment. In a first step the airbag 12 is provided including the plurality of chambers 16.

A cut-out 22 in the external wall 18 of a chamber 16 is provided at the inside of the desired bending in the shape of the airbag 12. The cut-out can be provided in the external wall 18 already upon providing the airbag 12 or can be realized by removing a section of the external wall 18.

In a following method step the insert 24 having the length $L_E$ is inserted in the cut-out 22 and is fastened to the external wall 18 by the seams 26.

The airbag 12 can then be mounted to the inflator 11 or to the housing 14 of the vehicle occupant restraint system 10 and can be folded up.

The invention claimed is:

1. An airbag (12) of a vehicle occupant restraint system (10), comprising plural juxtaposed compartments (16) delimited outwardly by opposing external walls (18) and against each other by partitions (20), wherein the airbag (12), when in the inflated condition, has an overall bent elongate form in cross-section, wherein in the bending area one of the opposing external walls (18) includes a cut-out (22) which is closed by an inserted insert comprising a panel (24) that is tensioned in the deployed condition and that has in the bending area a length ($L_E$) different from an opposing external wall portion (28) so as to produce the bending, the panel (24) including a first edge portion attached to the one of the opposing external walls (18) along a first edge of the cut-out (22) and a second edge portion attached to the one of the opposing external walls (18) along an opposing second edge of the cut-out (22).

2. The airbag (12) according to claim 1, wherein the panel (24) is provided inwardly or outwardly of the bending.

3. The airbag (12) according to claim 1, wherein the panel (24) is also fastened to the one of the opposing external walls (18) by seams (26, 27) by which a partition (20) is fixed to the same external wall (18).

4. The airbag (12) according to claim 1, wherein the external wall (18) opposing the panel (24) is formed in one piece.

5. The airbag (12) according to claim 1, wherein the panel (24) extends over substantially the entire width of the airbag (12).

6. The airbag (12) according to claim 1, wherein the panel (24) extends from one partition (20) to a neighboring partition (20).

7. The airbag (12) according to claim 1, wherein the second edge portion of the panel (24) that is attached to the one of the opposing external walls (18) is an integral extension of a partition (20).

8. The airbag (12) according to claim 1, wherein the panel (24) is a woven fabric.

9. The airbag (12) according to claim 1, wherein the airbag (12) extends in curved shape from one mounting end.

10. The airbag (12) according to claim 1, wherein the airbag (12) is a knee airbag.

11. A method of manufacturing an airbag (12) according to claim 1, for a vehicle occupant restraint system (10) comprising the method steps of:
providing an airbag (12) elongate in cross-section including a plurality of compartments (16) arranged successively in the longitudinal direction, each having a predetermined length in a spreading direction in the inflated condition;
providing a cut-out (22) in an external wall (18) of the airbag (12) that helps define at least one of the compartments (16); and
inserting an insert comprising a panel (24) having a length ($L_E$) in the spreading direction which is shorter or longer than a length ($L_A$) of an external wall portion (28) opposing the cut-out (22).

12. The airbag (12) according to claim 1, wherein the airbag (12) extends in curved shape from one mounting end against the direction of gravitation.

13. The airbag (12) according to claim 1, wherein the panel (24) is configured such that the first and second edge portions overlap an outer surface of the external wall (18).

14. The airbag (12) according to claim 1, wherein the panel (24) and the cut-out (22) are oriented in the same plane.

15. The airbag (12) according to claim 1, wherein a periphery of the panel (24) is connected to the external wall (18) along a periphery of the cut-out (22).

* * * * *